(12) United States Patent
Van Geenen et al.

(10) Patent No.: US 8,080,630 B2
(45) Date of Patent: *Dec. 20, 2011

(54) PROCESS FOR PREPARING A MELT-PROCESSABLE POLYAMIDE COMPOSITION

(75) Inventors: Albert A Van Geenen, Sittard (NL);
Cornelia E. M. Bronsaer, Stein (NL);
Yvonne H Frentzen, Venlo (NL);
Stanislaus M. P. Mutsers, Geleen (NL);
Nicolaas J. M. L. Janssen, Stein (NL)

(73) Assignee: DSM IP Assets B.V., Heerlen (NL)

( * ) Notice: Subject to any disclaimer, the term of this patent is extended or adjusted under 35 U.S.C. 154(b) by 16 days.

This patent is subject to a terminal disclaimer.

(21) Appl. No.: 10/545,968

(22) PCT Filed: Feb. 11, 2004

(86) PCT No.: PCT/NL2004/000097
§ 371 (c)(1),
(2), (4) Date: Oct. 5, 2005

(87) PCT Pub. No.: WO2004/074347
PCT Pub. Date: Sep. 2, 2004

(65) Prior Publication Data
US 2006/0173156 A1 Aug. 3, 2006

(30) Foreign Application Priority Data
Feb. 21, 2003 (EP) .................................. 03075512

(51) Int. Cl.
*C08G 69/20* (2006.01)
(52) U.S. Cl. ........ 528/310; 528/312; 528/315; 528/318; 528/323; 528/326

(58) Field of Classification Search .................. 528/323, 528/310, 312, 315, 318, 326
See application file for complete search history.

(56) References Cited

U.S. PATENT DOCUMENTS 6,528,614 B2 * 3/2003 Kloosterman et al. ........ 528/310
6,809,173 B2 * 10/2004 Schmid et al. ................ 528/310

FOREIGN PATENT DOCUMENTS

| DE | 22 41 132 A | 3/1973 |
|----|----|----|
| DE | 101 18 453 C 1 | 12/2002 |
| EP | 0 522 533 A | 1/1993 |
| JP | 09-003187 | * 1/1997 |

OTHER PUBLICATIONS

K. Ueda et al, "Stabilization of High Molecular Weight Nylon 6 Synthesized by Anionic Polymerization of Epsilon-Caprolactam"; Polymer Journal, Society of Polymer Science; Tokyo, JP; vol. 28, No. 12; pp. 1084 1089; XP001079538.
Kohan, Melvin I, *Nylon Plastics Handbook*, MIK Associates, ISBN 1-56990-189-9, pp. 17-18 (1995).

* cited by examiner

*Primary Examiner* — James J Seidleck
*Assistant Examiner* — Gregory Listvoyb
(74) *Attorney, Agent, or Firm* — Nixon & Vanderhye P.C.

(57) ABSTRACT

The invention relates to a process for preparing a melt-processable polylactam by contacting caprolactam monomer with an anionic polymerization catalyst, polymerizing said monomer and contacting the resulting polylactam with a protic compound. The anionic polymerization catalyst is chosen from the group consisting of alkali-earth-metal-lactamates and alkali-earth-metal-lactamate forming compounds and the protic compound has a pKa larger than 14. The resulting polylactam has a good melt-stability and very low cyclic dimer content.

10 Claims, No Drawings

PROCESS FOR PREPARING A MELT-PROCESSABLE POLYAMIDE COMPOSITION

This application is the U.S. national phase of international application PCT/NL2004/000097 filed 11 Feb. 2004 which designated the U.S. and claims benefit of EP 03075512.8, dated 21 Feb. 2003, the entire content of which is hereby incorporated by reference.

The invention relates to a process for preparing a melt-processable polylactam composition by contacting caprolactam monomer with an anionic polymerization catalyst, polymerizing said monomer under anhydrous conditions, and contacting the resulting polylactam in a solid form or as a melt with a protic compound.

Such a process is known from DE-10118453. In the known process a dried lactam monomer is contacted with an anionic polymerization catalyst and subsequently polymerized. After the polymerization a protic compound is added to the melt to deactivate the catalyst. Thereafter the polyamide can be granulated for further purposes or directly be used for the manufacture of shaped articles. Alternatively, the polyamide obtained from the polymerization is first granulated, then contacted with the protic compound, remelted and extruded. As the lactam monomer in the known process all known lactam monomers can be considered, including Lactam-6, (i.e. caprolactam). However, all examples concern Lactam-12. Catalysts suitable for the known process are mentioned to be catalysts and catalyst systems described in the literature and include metal lactamates, respectively lactamate forming compounds. As the catalyst primarily commercially available sodium lactamate dissolved in lactam is mentioned to be used. As protic compounds are mentioned compounds with acidity constant pKa less than about 14. Examples of such protic compounds that can be used as deactivator in the known process are reported to be carboxylic acids, and acids of phosphorous and boron. The polyamide prepared by the known process is reported to have in particular good melt stability, characterized by a reduced viscosity degradation when the polyamide is remelted.

A disadvantage of the known process is that when it is applied to caprolactam the resulting polycaprolactam has a high content of cyclic dimer. This makes the polyamide unattractive for direct use in applications such as films and fibers. To make the polyamide more suitable for these purposes the cyclic dimer content has to be reduced. This typically involves complicated extraction steps. Furthermore, the lactam recycled with the same extraction steps has to be subjected to a special treatment step to reduce the cyclic dimer content therein to make it suitable for reuse in further polyamide production.

The aim of the invention is to provide a process for preparing a melt-processable polycaprolactam that has a reduced cyclic dimer content.

This aim has been achieved with the process wherein the anionic polymerization catalyst is chosen from the group consisting of alkali-earth-metal-lactamates and alkali-earth-metal-lactamate forming compounds, and the protic compound has a pKa larger than 14.

Surprisingly, the polycaprolactam obtained with the inventive process has a much lower cyclic dimer content than the polycaprolactam prepared according to the known process. Whereas the polycaprolactam according to the known process has a typical cyclic dimer content of about 1%, relative to the weight of the polylactam, the polycaprolactam according the process of the invention has generally a cyclic dimer content of less than 0.3 weight %, in particular embodiments 0.2 weight % or less, and with typical values even as low as 0.1 weight % or below, relative to the weight of the polylactam. This means that compared to polycaprolactam obtained by the known process, less or even no cyclic dimer has to be removed from the polycaprolactam to reach a low-level of cyclic dimer content for making the polylactam more suitable for use in fibers and films. Furthermore, extraction steps or other processes needed for removal of residual monomer can be less critical and less complicated. Also the caprolactam monomer recycled by such extraction steps will contain less cyclic dimer, making the work-up of said caprolactam for reuse in further polymerization steps also less complicated. Furthermore, it has been found that a protic compound having a pKa larger than 14 is powerful enough to deactivate the alkali earth metal catalyst according to the process of the invention in such an extent that a melt-processable polylactam is obtained, without the need of removal of residual catalyst by extraction or otherwise. This is surprising in view of the comment made in the cited prior art that weak protic compounds the anionic lactam polymerization only retard, but not completely stop. Evidently, by using the anionic polymerization catalyst as according to the invention, instead of a sodium-based catalyst, this problem has been overcome. Moreover, the deactivation is not only evident from the fact that further polymerization is stopped. Deactivation is in particular noted in processes wherein the polylactam is freed of lactam monomer residues in the melt, wherein back reaction to caprolactam does not occur anymore in significant extent, whereas under standard conditions, e.g. with hydrolytically formed caprolactam, caprolactam is reformed rather quickly up to an equilibrium amount which increases significantly with temperature.

Thus, the process according to the invention allows for the preparation of a polylactam composition, comprising a polylactam and the reaction product of a protic compound having a pKa larger than 14 and an anionic polymerization catalyst chosen from the group consisting of alkali-earth-metal-lactamates and alkali-earth-metal-lactamate forming compounds, or residues thereof, which composition is melt processable and low in cyclic dimer content and which is suitable for direct use in further processes involving melt processing steps.

In the context of the application a melt-processable polylactam is understood to be polylactam that, after being prepared, can be made free of, or essentially so, of volatile components, and can be processed by melt-processing into products like polyamide compounds and/or can be shaped into shaped products like fibers, films and molded articles.

In the context of the application anhydrous conditions are understood to be represented by a lactam monomer with a moisture content of less than 1000 ppm, and by an optional surrounding gas atmosphere with a moisture content of less than 100 ppm. These anhydrous conditions are more critical where a small amount of catalyst is used, since this might otherwise lead to a premature deactivation of the catalyst and very long polymerization times if any polymerization at all. With a large amount of catalyst, the moisture content is less critical. Preferably, the lactam monomer has a moisture content of less than 500 ppm, more preferably less than 300 ppm, most preferably less than 150 ppm. Preferably, the optional surrounding gas atmosphere comprises less than 20 ppm moisture, even more preferably less than 10 ppm moisture. The advantage of a lower moisture content is that the polymerization is more reproducible in terms of conversion speed and in terms of relative viscosity of the resulting polyamide.

In the context of the application alkali earth metals are understood to be the Group-II elements of the Periodic Table of Elements, consisting of Be, Mg, Ca, Sr, Ba, Ra.

In the process according to the invention the catalyst is chosen from the group consisting of alkali-earth-metal-lactamate and alkali-earth-metal-lactamate forming compounds, wherein the alkali earth metal is Be, Mg, Ca, Sr, Ba, or Ra.

The alkali-earth-metal-lactamate forming compounds can be any compound that reacts upon contacting with caprolactam monomer to form an alkali-earth-metal-lactamate. The lactam in said formed alkali-earth-metal-lactamate typically is caprolactam.

Suitable alkali-earth-metal-lactamate forming compounds that can be used in the inventive process include organo-alkali-earth-metal-halides, diorgano-alkali-earth-metal compounds, amido alkali-earth-metal halides, and alkali-earth-metal bisamides, but are not limited thereto.

Organo alkali-earth metal halides are halide compounds, which are considered to comprise a hydrocarbon radical bound to an alkali earth metal halide, wherein the hydrocarbon radical can be an alkyl, cycloalkyl, aryl, aralkyl or alkaryl radical. The halides can be F, Cl, Br or I, preferably Cl, Br, or I, more preferably Br. The halides can be F, Cl, Br or I.

Diorgano alkali-earth metal compounds are compounds having two hydrocarbon radicals bound to an alkali earth metal halide, wherein the hydrocarbon radicals can both or either be an alkyl, cycloalkyl, aryl, aralkyl or alkaryl radical.

Amido-alkali earth metal halides are alkali earth metal halide compounds, which are considered to comprise an ionic bound between an amide ion, i.e. a deprotonated amide, and an alkali earth metal halide. The amido-alkali-earth metal halide can be the reaction product of an organo alkali-earth metal halide with an amide. Suitable amides, from which the amido-magnesium halide may be prepared, include non-cyclic amides and cyclic amides. Suitable cyclic amides include, for example, cyclic hexamethylene adipamide and lactams. Suitable lactams are, for example, ε-caprolactam, enantholactam, caprylolactam, decanolactam, undecanolactam and dodecanolactam.

Alkali earth metal bisamides are compounds comprising two amide groups bound the alkali earth metal. These compounds can be prepared for example by reacting a diorgano alkali-earth metal compound and for instance a lactam. Suitable amides from which the alkali earth metal bisamides can be prepared are the same as mentioned above for the amido-alkali earth metal halides.

The lactam in the alkali-earth-metal-lactamates can be selected from all known lactam monomers. Suitable lactamates are, for example, the alkali-earth-metal-lactamates of lactam monomers having 5-12 C atoms. Preferably, the alkali-earth-metal-lactamate is a lactamate of caprolactam, since this corresponds with the monomer that is polymerized in the inventive process.

Preferably the anionic polymerization catalyst chosen from the group consisting of alkali-earth-metal-lactamates and alkali-earth-metal-lactamate forming compounds is a magnesium lactamate or a magnesium lactamate forming compound, more preferably the catalyst is chosen form the group consisting of organomagnesium halides, diorgano-magnesium compounds, amidomagnesium halides, and magnesiumbisamides.

The advantage of the use of a catalyst chosen form said group consisting of magnesium compounds in the process according to the invention is they can be prepared in a simple way from Grignard compounds and ensure fast polymerization, with higher conversion in shorter times and resulting in a lower cyclic dimer content. Illustrative examples of suitable organomagnesium halides are methyl-magnesiumbromide, methyl-magnesiumchloride, methyl-magnesiumiodide, ethyl-magnesiumbromide, ethyl-magnesiumchloride, ethyl-magnesiumiodide, isopropyl-magnesiumbromide, isopropyl-magnesiumchloride, n-propyl-magnesiumiodide, tertiary-butyl-magnesiumbromide, iso-butyl-magnesiumchloride, n-butyl-magnesiumiodide, cyclohexyl-magnesiumbromide, cyclohexyl-magnesiumchloride, cyclohexyl-magnesiumiodide, 2-ethylhexyl-magnesiumbromide, 2-ethylhexyl-magnesiumchloride, 2-ethylhexylmagnesiumiodide, n-octadecyl-magnesiumbromide, n-octadecyl-magnesiumchloride, n-octadecyl-magnesiumiodide, benzyl-magnesiumbromide, benzyl-magnesiumchloride, benzyl-magnesiumiodide, phenyl-magnesiumbromide, phenyl-magnesiumchloride, phenyl-magnesiumiodide, mesityl-magnesiumbromide, mesityl-magnesiumchloride, mesityl-magnesiumiodide, naphthyl-magnesiumbromide, naphthyl-magnesiumchloride, naphthyl-magnesiumiodide.

Suitable diorganomagnesium compounds are, for example, dimethylmagnesium, diethylmagnesium, dipropylmagnesium, dibutylmagnesium, diphenylmagnesium, dibenzylmagnesium. Suitably, the diorganomagnesium compound is contacted with an appropriate magnesium halide in the presence of the lactam at a temperature above the melting point of the lactam to form a lactam magnesium halide.

Suitable amido-magnesium halides are, for example, the amido magnesium halides prepared from cyclic hexamethylene adipamide, caprolactam, enantholactam, caprylolactam, decanolactam, undecanolactam and dodecanolactam. The amido-magnesium halide can be the reaction product of an organomagnesium halide with an amide.

Preferably, the amido-magnesium halide is a lactam-magnesium-halide. The lactam-magnesium halide is, for example, a lactam-magnesium iodide, lactam-magnesium bromide, lactam-magnesium chloride.

More preferably, the lactam is the same as the lactam that is polymerized. The advantage is that the composition that is polymerized does not contain additional components.

The lactam magnesium halide may be prepared in-situ by contacting an organomagnesium halide with the lactam or lactam mixture that is to be polymerized at a temperature above the melting temperature of the lactam. This has the advantage that no separate preparation step for preparing the lactam magnesium halide is needed.

Suitable magnesiumbisamides that can be used are magnesium compounds comprising two amides and/or lactams from the group mentioned above, bonded to magnesium.

In a preferred embodiment of the invention, the catalyst is an organomagnesium halide or an amidomagnesium halide. This has the advantage that process shows a higher polymerization speed, which allows the use of the catalyst in a lower concentration, and that a polylactam with a lower content of cyclic dimer is formed.

More preferably, the organomagnesium halide or amidomagnesium halide is an organomagnesium bromide or an amidomagnesium bromide. The advantage is readily availability of alkylmagnesium bromide compounds (Grignard)

Also more preferably, the organomagnesium halide comprises a lower alkyl group i.e. methyl, ethyl, propyl and butyl. The advantage is that when the organomagnesium halide reacts with the lactam, a volatile alkane will be formed, which can more easily be removed from the melt during or after polymerization.

The catalyst is generally used in an amount of 0.001-5 weight %, relative to the weight of lactam monomer. A higher amount may be used but is not effective as the increase in the conversion rate generally levels off with higher amount of catalyst.

Preferably the amount of catalyst 0.01-2 weight % and more preferably 0.025-1 weight %, relative to the weight of lactam monomer. The advantage of the use of the catalyst in a higher minimal amount is a higher polymerization speed. A higher amount of catalyst is also advantageously applied when the process is carried out with a low amount of activator or no activator at all (as explained herein further down). The advantage of the use of the catalyst in a lower maximum amount is that the resulting composition has a lower residual catalyst content, which allows addition a lower amount of protic compound to deactivate the catalyst and to obtain a melt-processable polylactam with improved melt-stability. Improved melt-stability is characterized in that the polylactam, when kept for a longer period at elevated temperature, retains its intrinsic viscosity over a longer time or with only small variations in the same time period.

The optimal amount of catalyst can in principle be determined experimentally by a person skilled in the art of preparing polylactams through systematic research.

Suitable protic compounds with a pKa larger than 14 that can be used in the process according to the invention are, for example, aliphatic alcohols (such as methyl alcohol, having a pKa of about 15.5, ethanol having a pKa of about 15.9, and tert-butanol pKa 18) and water (pKa 15.7). Suitable protic compounds also include compounds containing crystal water and water forming metal hydroxides. A water forming metal hydroxide is defined here as a metal hydroxide that releases water at the temperature at which the metal hydroxide is contacted with the polylactam. The water that is released is supposed to be the species that deactivates the catalyst. Metal hydroxides are therefore considered for the purpose of this application to have the same pKa as water, i.e. 15.7. During said release of water, the metal hydroxide is typically converted in a metal oxide. This metal oxide is generally harmless for the polylactam. Suitable metal hydroxides are, for example, magnesium hydroxide, and aluminum hydroxide.

Preferably, the protic compound has a pKa of between 14 and 18, more preferably between 15 and 17 and even more preferably between 15.5 and 16. The advantage of a lower upper limit for the pKa is that the protic compound is more effective as a catalyst deactivator, as a result of which the deactivation takes place faster and/or the protic compound can be used in a smaller excess over the catalyst to obtain a melt-stable polylactam and/or a polylactam with improved melt-stability is obtained.

Still more preferable the protic compound is water or a water forming metal hydroxide. The advantage of the use of water or a water forming metal hydroxide as the protic compound in the process according to the invention is that the protic compound may be used in larger excess over the catalyst without having a significant effect on the oxidative stability of the polylactam at elevated temperature. A further advantage is that when the polyamide is subjected to a drying step, for example applied before the polyamide is being processed in a compounding or moulding step, the water removed from the polyamide in said drying step is not contaminated with volatile organic compounds as would be the case with low molecular organic compounds, such as low molecular weight alcohols or carboxylic acids, used as the deactivator.

Most preferably, the protic compound is water. Water is a polyamide-compatible compound and constitutes a component that is generally present in nylon obtained by conventional mass melt polymerization processes. The advantage of the use of water as the deactivator is that it avoids the introduction of an additional, alien substance. A further advantage is that water has a very short reaction time, resulting in very effective, almost immediate, deactivation. In addition, water can be added to solidified polylactam, for example by soaking the solidified polylactam in the form of granules in water during a subsequent extraction step, which step eliminates a separate addition step at elevated temperature. Furthermore, the polylactam obtained by the process according to the invention wherein the catalyst is deactivated with water, has a very good melt-stability, and which polylactam, upon extraction of caprolactam and drying of the polylactam, can be maintained for a longer time period at elevated temperature without reformation of caprolactam monomer.

In a preferred embodiment of the process according to the invention, the polymerization of caprolactam is carried out in the presence of an activator. An activator is advantageously used to allow a faster process. According to this preferred embodiment the caprolactam monomer is contacted with the activator prior to, simultaneous with or shortly after contacting the lactam with the catalyst. With "shortly after the lactam is contacted with the catalyst" is understood herein that the lactam has not yet been polymerized or in a limited extend, such as up to 20 weight % relative to the weight of lactam, only.

Preferably, the caprolactam monomer is contacted with the activator prior to or simultaneous with contacting the lactam with the catalyst. The advantage is a better control of the molecular weight Suitable activators that can be used in the process according to the invention are, for example, acyllactams, lactam-blocked isocyanates (also referred to as carbamoyl lactams), oxazolines, oxazoline-blocked isocyanates (also referred to as carbamoyl oxazolines), carbodiimides, isocyanates, addition products prepared from an isocyanate and a proton donor such as an alcohol or an amide, ketenes, acid chlorides, acid anhydrides, N-substituted imides or N,N-diacyl compounds comprising two acyl radicals.

Preferably, the activator is chosen from the group consisting of acyllactams, lactam-blocked isocyanates, oxazolines, oxazoline-blocked isocyanates and carbodiimides.

More preferably, the activator is an acyllactam or a carbamoyl lactam. Polylactams, prepared with the process according to the invention, wherein the activator is an acyl-lactam or a carbamoyl lactam, have, after deactivation of the catalyst, a better melt stability. A further advantage of these activators is their easy preparation from an acid chloride and a lactam, respectively from an isocyanate and a lactam; some representative acyllactams and carbamoyl lactam materials are also commercially available.

Suitable acyllactams are, for example, N-acetylcaprolactam adipoylbiscaprolactam, isophthaloylbiscaprolactam, terephthloylbiscaprolactam, n-propionylcaprolactam and n-butylcaprolactam. The acyllactam can be obtained as the reaction product of the reaction of a lactam with a carboxylic acid chloride or carboxylic acid anhydride. The hydrochloric acid or carboxylic acid formed in said preparation preferably is removed from said reaction.

The carbamoyl lactam can be the reaction product of an isocyanate and lactam. In the process according to the invention the carbamoyl lactam may be prepared in situ in the lactam by adding the appropriate amount and type of isocyanate to the lactam prior, during or after the catalyst is contacted with the lactam.

The isocyanate can be any isocyanate with one or more isocyanate groups, for instance a mono-isocyanate, a di-isocyanate, a tri-isocyanate or a poly-isocyanate. Preferably, the carbamoyl lactam is derived from a mono-isocyanate, since this gives a polylactam with a lower degree of branching and a reduced tendency of gel formation.

Suitable carbamoyl lactams are, for example, lactam-blocked aromatic isocyanates, [such as lactam blocked phenylisocyanate, lactam-blocked toluenediisocyanate, lactam-blocked methylenediphenyidiisocyanate, reaction products of lactam with higher oligomers of methylenediphenyldiisocyanate], and lactam-blocked aliphatic isocyanates, [such as lactam-blocked 1,6-hexanediisocyanate, lactam-blocked xylylenediisocyanate, lactam-blocked isophoronediisocyanate, lactam-blocked methylenedicylcohexyldiisocyanate and reaction products of lactam with higher oligomers of 1,6-hexanediisocyanate].

In a preferred embodiment the activator is an acyllactam. The advantage of the use of acyllactam as the activator in the process according to the invention is that a polylactam with a lower degree of branching is obtained. Furthermore, the molecular weight, or relative viscosity, of the resulting polylactam can be better regulated with the amount of acyllactam. A higher amount of acyllactam results in a polylactam with a lower molecular weight, whereas a lower amount of acyllactam results in a higher molecular weight polylactam.

More preferably, the activator is acetyl-caprolactam.

The activator is typically used in an amount of 0.1-10 weight %, preferably 0.2-5 weight %, relative to the weight of the lactam that is polymerized. The activator being a carbamoyllactam is more preferably used in an amount of 0.5-5 weight %, while the activator being an acyllactam is more preferably used in an amount of 0.2-3 weight %, relative to the weight of the lactam that is polymerized.

The optimal amount of activator can in principle be determined experimentally by a person skilled in the art of preparing polylactams through systematic research.

The polymerization of the caprolactam monomer in the process according to the invention may be carried out in the presence of components that are copolymerizable with caprolactam, thereby forming a polylactam comprising caprolactam and the copolymerizable components. Caprolactam and the copolymerizable components together are defined here as the polymerizable components.

Suitable components that are copolymerizable with caprolactam include, for example, other lactam monomers and polyols bearing hydroxide groups modified with isocyanate groups or with acyllactam groups.

Suitable lactam monomers that can be copolymerized with caprolactam include C5-lactam and lactam monomers containing at least 7 carbon atoms in the lactam ring, for example enantholactam, caprylolactam, decanolactam, undecanolactam dodecanolactam, and mixtures thereof.

Preferably, the lactam monomer that is copolymerized with caprolactam is dodecanolactam. The process according to the invention wherein caprolactam is copolymerized with dodecanolactam is advantageously applied for preparing amorphous polylactam that can be used in fish yarns and films with improved transparency and/or less mottling of the surface of said products.

Copolymerization of caprolactam monomer with polyols bearing hydroxide groups modified with isocyanate or acyllactam groups is advantageously applied for the preparation of nylon block copolymers. Suitable polyols bearing hydroxide groups that can be modified with isocyanate or acyllactam groups for use in the inventive process include polyester polyols (such as polyethylene terephthalate, polybutylene terephthalate and mixtures thereof), and polyether polyols, for example polyglycol ethers (such as polyethyleneglycol ether, polypropyleneglycol ether, and polybutyleneglycol ether and copolymers of polyethers, for instance polypropylene-ethylene ether).

Preferably the polyol has a glass transition temperature (Tg) of at most 0° C., more preferably at most −20° C. and even more preferably at most −40° C. The advantage of the process according to the invention wherein caprolactam is copolymerized with a isocyanate or acyllactam modified polyol with a lower Tg, is that the resulting polylactam has improved low temperature flexibility and toughness The mechanical characteristics of the copolymer compounds will depend on the ratio of polyamide and polyol backbone in the composition, higher amounts of polyamide will result in more rigid copolymer while higher amounts of for instance polyethers will result in tougher copolymers.

The copolymerizable components that can be used in the process according to the invention constitute a quality that is suited for anionic polymerization. Such copolymerizable components generally comprise a low amount of water, typically below 0.1 weight %, relative to the weight of the copolymerizable component. Higher amounts may be used, but generally require a higher amount of catalyst.

Preferably, the amount of water in the copolymerizable component is below 0.05 weight %, more preferably below 0.03 weight %, and most preferably below 0.015 weight %, relative to the weight of the copolymerizable component. A lower amount of water is preferred, since this gives more reproducible results in terms of conversion speed of the polymerization reaction and in terms of molecular weight, or relative viscosity, of the resulting polylactam at maximum conversion.

In a preferred embodiment of the process according to the invention caprolactam constitutes at least 50 weight %, more preferably at least 75 weight % and even more preferably at least 90 weight %, relative to the total weight of polymerizable components. Most preferably, the polymerizable components only consist of lactam. The higher the weight % of caprolactam relative to the total weight of polymerizable components, the higher the conversion rate of caprolactam at maximum conversion. Furthermore, the larger the content of lactam in the polymerizable components, the larger the risk of cyclic dimer formation in a conventional process would have been and the larger the effect of the process according to the invention in reducing the formation of cyclic dimer.

In an additional variant of the process according to the invention the polymerization step or the catalyst deactivation step is carried out in the presence of at least one additive. In this variant the at least one additive is added before, during or immediately after polymerization of the caprolactam, or during the catalyst deactivation step to form a polylactam compound comprising the polylactam and the at least one additive. With "immediately after polymerization of the caprolactam" is understood in the context of this invention, that the additive is added to the polylactam melt before the catalyst deactivation step. The advantage of this variant is that a separate compounding step for preparing the compound can be omitted. A further advantage of the inventive process is that the polymerization can be performed in a relative small reactor, even for large scale production, allowing preparation of small batches of different polylactam compounds comprising different additives and fast changes between different compounds, this in contrast to conventional mass melt polymerization processes involving hydrolytic polymerization in a so-called VK-column. Also the loss of material of intermediate quality due to changes between different compounds can be reduced.

Addition of the additive to a melt of caprolactam before substantial polymerization of the caprolactam has taken place is particular advantageous for additives which don't interfere with the catalyst or with the polymerization process, or hardly so, and which additives are sensitive to mechanical degradation when added to and mixed with a highly viscous polymer melt under high shearing forces. Another advantage is that the additive can be perfectly wetted. Furthermore, with such a process, high filling degrees of additives in high molecular weight polylactam are easier attainable than with addition of additives to polyamides in a conventional compounding process. Also, higher glass fiber contents with limited fiber break down can be achieved, which are unachievable in conventional compounding processes.

Whether an additive does interact or not with the catalyst or the polymerization process, or in a limited acceptable manner only, can simply be determined experimentally by a person skilled in the art by comparison of, for example, the polymerization speed, maximum conversion and melt viscosity of the process in the presence or in the absence of the additive.

The additive may already be present in caprolactam flakes, or be mixed with molten lactam, and added together to the polymerization unit.

Additives, which need good dispersion in the polymer melt, are advantageously added to the polymer melt.

Additives that can interact with the catalyst are preferably added at the end of the polymerization, for instance just before or simultaneous with the addition of the protic compound.

Suitable additives that can be used in this variant of the process according to the invention include, for example, dispersed reinforcing materials [such as chopped or milled glass fibers, chopped or milled carbon fibers, nano-fillers, clays, wollastonite and micas], flame retardants, fillers [such as calcium carbonate], pigments, processing aids [such as mould release agents], stabilizers [such as antioxidants and UV stabilizers], plasticizers, impact modifiers, carrier polymers, etc. In contrast to dispersed reinforcing materials, continuous reinforcing materials are explicitly excluded, since this would prevent further melt processing of the composition.

The amount of additive can vary from very small amounts such as 1 or 2 volume %, or even lower, up to 70 or 80 volume % or more, relative to the volume of the compound formed.

Suitably, the amount of additives chosen from the group consisting of reinforcing agents, flame retardants and fillers, is between 0.5 and 150 weight %, relative to the weight of the polylactam formed in the inventive process. Preferably, the amount is between 5 and 100 weight %, more preferably between 20 and 50 weight %, relative to the weight of the polylactam formed in the inventive process.

Suitably, the amount of additives chosen from the group consisting of pigments, processing aids, stabilizers, impact modifiers, plasticizers and carrier polymers, is between 0.1 and 25 weight %, relative to the weight of the polylactam formed in the inventive process. Preferably, the amount is between 0.2 and 10 weight %, more preferably between 0.5 and 5 weight %, relative to the weight of the polylactam formed in the inventive process.

The polymerization step in the process according to the invention may be carried at any temperature above the melting temperature of the lactam. The polymerization can be carried out, for example, as a cast polymerization or as a mass melt polymerization.

Cast polymerization is understood herein after to be a polymerization process carried out above the melting temperature of the lactam and below the melting temperature of the polylactam.

Mass melt polymerization is understood herein after to be a polymerization process carried out above the melting temperature of the lactam and above the melting temperature of the polylactam.

If the polymerization is carried out as a cast polymerization, the catalyst in the polymer may be deactivated, for example, by melting the polylactam and than adding the protic compound having a pKa above 14, or by granulating the polylactam and soaking the granulated polylactam in protic compound, preferably water.

If the polymerization is carried out as a mass melt polymerization, the catalyst in the polymer may be deactivated, for example, by adding the protic compound having a pKa above 14 to the polylactam melt, or by cooling the polylactam melt to solidify the polylactam, granulating the solidified polylactam and contacting the granulated polylactam with protic compound, for example, by soaking the granulated polylactam in protic compound, preferably water or extracting the granulated polylactam with water.

Preferably the polymerization step in the process according to the invention is carried out as a mass melt polymerization. This has the advantage that no additional melting, cooling and/or granulating step is needed before the protic compound having a pKa above 14 can is added. A further advantage is that the process can more easily be carried out as a continuous process and be integrated with further processing steps.

The temperature at which the mass melt polymerization in the process according to the invention is carried out is above the melting temperature of the polylactam. Typically, the temperature is between 5° C. and 80° C. above said melting temperature. Preferably, the temperature is between 5° C. and 50° C., more preferably between 5° C. and 30° C. above the melting temperature of the polylactam. The advantage of a smaller difference between the temperature at which the anionic polymerization is carried out and the melting temperature of the polylactam is that at maximum conversion of the polymerization a polylactam is formed with a lower content of unreacted caprolactam.

In such a process, the caprolactam and catalyst, and where applicable the activator, copolymerizable components and additives, all together mentioned ingredients, may be metered as separate streams to a reactor wherein the ingredients are mixed, the ingredients may also be metered to a mixing device and metered together from the mixing device to the reactor. Preferably the caprolactam, catalyst, activator and copolymerizable component are metered in liquid form. For this purpose, the caprolactam has to be in a melt form, i.e. at a temperature that is above the melting temperature of caprolactam. The catalyst and/or activator may also be added as a melt, or as separate solutions of respectively the catalyst and/or activator in the lactam. The additives may be metered to the reactor in solid form, liquid form, or as a gas, depending on the nature of the ingredient. When metered to the mixing device, the additive is preferably added in solid or liquid form. If the additive is a solid, also at elevated temperature, i.e. at the polymerization temperature, the additive can, for example, also be added as a dispersion in caprolactam.

When the ingredients are first added to the mixing device prior to metering to the reactor, the temperature at which the ingredients are mixed in said mixing device is preferably between the melting temperature of the lactam and the melting temperature of the polylactam. This has the advantage that the conversion speed of the polymerization, if already taking place in the mixing device, remains relatively low.

Preferably, the temperature at which the ingredients are mixed in the mixing device is between 5° C. to 50° C., more preferably between 5° C. to 25° C. above the melting temperature of the lactam. The advantage of a lower mixing temperature is that the conversion speed is even lower.

The mass melt polymerization process of the invention can be carried out in any type of polymerization unit suitable for melt mass polymerization of lactams. Examples of suitable polymerization units are, for instance, stirred tank reactors (including continuous stirred tank reactors), flow-through reactors [such as tubular reactors], vertical column reactors, extruders and so on.

Preferably, the reactor is a continuous stirred tank reactor or a tubular reactor. The advantage is that the process can be carried out as a continuous process with a reactor with a relative small reactor volume and/or that the process allows a better temperature control.

The process according to the invention can be carried out in different ways, for example, as a batch process, a cascade process or as a continuous process.

Preferably, the process is carried out as a continuous process. This has the advantage that the polymerization can be performed in a relative small reactor, even for large scale production. A further advantage is that the process can easier be combined with further processing steps without the need of intermediate cooling and remelting of the polylactam.

The process according to this preferred embodiment of the invention can for example be carried out by continuously dosing the lactam, the catalyst, the activator and optionally other components, (together referred to hereinafter as the ingredients) to a polymerization unit and continuously mixing and conveying said ingredients meanwhile heating the ingredients to a temperature above the melting temperature of the caprolactam and at least partially polymerizing the caprolactam in said polymerization unit, thereby continuously forming a polylactam melt. After the polymerization the polymer melt can optionally be treated in a catalyst deactivation step, a degassing step, a compounding step, and/or a polymer-shaping step, such as a melt extrusion or injection-molding step.

Preferably, the process according to the invention comprises a polymerization step thereby forming a polylactam melt, and a melt-shaping step for shaping said polylactam melt into a shaped article.

In a more preferred embodiment the process is a continuous process, comprising a degassing step and a melt-shaping step. Generally the degassing step requires formation of gas/liquid interface between the polymer melt and the surrounding gas environment, whereby a large ratio between the gas/liquid interface and melt volume is realized. In an even more preferred embodiment the degassing step and melt-shaping step are combined. This has the advantage that there is no need to collect the degassed polylactam melt in a separate apparatus before the melt is melt-shaped into a shaped article. Such a combination is advantageously applied, for example, in a process comprising fiber spinning as the melt-shaping step.

In another more preferred process the degassing step is carried out in the apparatus that is used for the melt-shaping step. This has the advantage that the two steps can be carried out in a single apparatus and no extra apparatus is needed. This process is advantageously applied, for example, in a process comprising injection molding, as the melt-shaping step, and using an extruder for both the degassing and melt-shaping.

Suitable processing steps, which may be linked to the continuous process according to one of the above preferred embodiments of the invention are, for example, degassing, compounding and/or a polymer shaping.

The process according to the invention may advantageously comprise a degassing step, wherein, after the caprolactam is polymerized to form a melt comprising the polylactam and the catalyst in the melt is deactivated with a protic compound with a pKa larger than 14, the polylactam melt is degassed to remove, at least partially, unreacted caprolactam monomer retained in the polylactam melt. The advantage of the inventive process comprising said degassing step is that reformation of caprolactam due to depolymerization of polylactam forced by the thermodynamic equilibrium between polylactam and unreacted lactam is very limited if not eliminated at all and a polylactam melt with a lower content of unreacted caprolactam monomer can be obtained without the need of a separate extraction step, while if a separate extraction step is applied to reach an even lower residual caprolactam content, less caprolactam has to be extracted and less extraction medium is needed. A further advantage is that the unreacted caprolactam, removed by the degassing step, comprises a very low amount of cyclic dimer, and no-to-nearly-no higher oligomers, allowing the degassed caprolactam to be used in other caprolactam polymerization processes with less need, if any, of a prior depolymerization step.

Preferably, the unreacted caprolactam is removed to a residual caprolactam content of below 1 weight %, more preferably below 0.5 weight %, even more preferably below 0.3 weight % and most preferably below 0.2 weight % (relative to the weight of the polylactam). The advantage of a lower residual lactam content is that also for more critical applications there is less need or no need at all for an intermediate cooling and extraction step and that the polymer can directly be shaped from the melt into the end-product while having a low residual lactam content.

Degassing is in particular advantageously used in combination with the continuous process according to the invention wherein as the protic agent water is used in an amount in excess of the catalyst. This has the advantage that in the degassing step the excess water is removed by evaporation simultaneously with the caprolactam monomer, whereby the water works as an entrainment agent and the evaporation of water contributes to a faster evaporation of the lactam.

Preferably, the polylactam is degassed to a water content below 0.2 weight %, more preferably below 0.1 weight %, relative to the weight of the polylactam. A lower water content has the advantage that it will meet the specifications for injection moulding or fiber forming polyamide without the need of a separate drying step during manufacturing Suitable degassing units that can be used for the degassing step in the process according to the invention, are, for example, falling film evaporators [for example, such as described in DE-A-10016894], spinning disc film evaporators, flash apparatus, film extruders, fiber extruders, and film scrapers. The degassing step may also be carried out in a degassing unit in which vacuum is applied, or in which a liquid entrainment agent, [for example, such as described in WO-A-0174925] is used.

The invention also relates to a process, wherein the degassed material, obtained by the degassing step as described herein above and comprising lactam and optionally small amounts of other volatile components, is recycled into the same polymerization process or into another polymerization process, such as a hydrolytic polymerization process. The advantage of this process is that the degassed material comprises almost no, if any, cyclic dimer while the amount other volatile components, such as water, if any, is very low, which eliminates the necessity of a separate step for depolymerization, as is often used for a lactam extraction process in a conventional hydrolytic process for production of fiber grade polyamide-6. Furthermore, if the lactam is reused in a hydrolytic polymerization step there is even no step needed to reduce the water content as is normally applied with water-extracted caprolactam.

In another variant of the process of the invention, the polylactam obtained after polymerization is cooled to solidify and is then extracted with water. The advantage of such a process is the simultaneous removal of residual unreacted caprolactam and deactivation of the catalyst. This results in a polylactam with a very good melt stability. Compared to conventional hydrolytic polymerization processes and anionic polymerization processes with, for instance, an alkali metal catalyst with an extraction step, the extraction of polylactam obtained by the process of the invention is less demanding since there is no need to extract cyclic dimer. This has the advantage that a shorter contact time between polylactam and extraction medium is necessary as a result of which the extraction can be carried out in a relative short time and/or in relative small equipment, compared to extraction of polylactam obtained with conventional hydrolytic process or obtained with a anionic polymerization process with an alkali metal catalyst.

In a further embodiment, the process according to the invention comprises a compounding step, wherein, after deactivation of the catalyst with the protic agent with a pKa larger than 14, at least one additive is added to the polylactam to form a polylactam compound comprising the polylactam and the at least one additive. The advantage of the process according to this variant is that an intermediate cooling and remelting step of the polylactam can be omitted, thereby making the compounding process economically more favorable. A further advantage is that the polymerization can be performed in a relative small reactor, even for large scale production, allowing preparation of small batches of different polylactam compounds comprising different additives and fast changes between different compounds, this in contrast to conventional mass melt polymerization processes involving hydrolytic polymerization in a so-called VK-column. Also the loss of material of intermediate quality due to changes between different compounds can be reduced.

Suitable additives that can be used in this variant of the process according to the invention include, for example, reinforcing materials [such as glass fibers and carbon fibers, nano-fillers like clays, including wollastonite, and micas], pigments, fillers [such as calcium carbonate], processing aids, stabilizers, antioxidants, plasticizers, impact modifiers, flame retardants, mould release agents, etc.

The amount of additive can vary from very small amounts such as 1 or 2 volume % up to 70 or 80 volume % or more, relative to the volume of the compound formed.

The compound formed in the process according to the above variant may be further processed, for example, by cooling and granulating.

For the purpose of the polymer compounding the polymerization unit may be combined with a polymer-compounding unit. Suitable apparatus that can be used as the polymer-compounding unit are, for example, single-screw extruder and twin-screw extruders.

In a further embodiment of the process according to the invention, the process comprises a polymer-shaping step. In this variant, the melt of the polylactam obtained by polymerization of the lactam and deactivation of the catalyst with the protic agent with a pKa larger than 14, is subjected to the polymer shaping step. The polymer processing industry is widely involved in preparing polymers and in preparing intermediate polymer products, such as polymer based compounds to be used for the manufacturing of final products like molded articles, as well as preparing final products such as fibers and films. The state of the art is to first prepare the polymers and in a separate process step to prepare the compounds, films and fibers. A substantial part of the industry is involved in preparing, respectively processing, of polymers of the group of thermoplastic polyamides. Both preparation and processing of thermoplastic polyamides is generally performed at high temperature. Generally the polyamide polymer is cooled after being prepared, treated to reduce the cyclic dimer content and then heated again to above its melting temperature to be further processed. This is, from an energy consumption point of view, a very unattractive process. The advantage of the process comprising a polymerization step and catalyst deactivation step according to the invention in combination with a melt-shaping step as described above is that it allows the polylactam formed to be processed into a final product without the need of an intermediate cooling, cyclic dimer reduction and re-melting step, making the process economically more favorable.

The polymer-shaping step may be preceded, for example, by a degassing step and/or a compounding step as described herein.

For the purpose of the polymer shaping the polymerization unit may be combined with a polymer-shaping unit. These units may optionally be combined with a degassing unit and or compounding unit.

Suitable apparatus that can be used as the polymer-shaping unit include, for example, equipment for injection molding, film extrusion, shape extrusion, film bloating, and fiber spinning.

The invention also relates to a polylactam composition, comprising a polylactam obtainable by the process according to the invention and the reaction product of a protic compound having a pKa larger than 14 and an anionic polymerization catalyst chosen from the group consisting of alkali-earth-metal-lactamates and alkali-earth-metal-lactamate forming compounds, or the residues thereof. The polylactam composition according to the invention has a good melt stability, characterized by a limited variation in molecular properties such as relative viscosity and/or end groups when the polyamide composition is kept at elevated temperature for an extended time period. A further advantage is that this inventive polylactam composition has a reduced cyclic dimer content and is suited for direct further processing, such as degassing, without the need of extraction of cyclic dimer or other processing step. Furthermore, the inventive polylactam composition has very good anti-stain properties, hydrolytic stability and thermal stability.

Compositions comprising the reaction product of benzyl alcohol and ethyl magnesium bromide, or residues thereof, in an amount of 0.4 to 0.5 mole %, relative to caprolactam monomer units in the polylactam have been excluded from the invention. Benzyl alcohol is known to have a pKa of 15.4 (source: S. Skonieczny, Ionization constants of some inorganic acids/ionization constants of some ions; http://citd.utsc.utoronto.ca/CHM/C42/PDF/pKas.doc.pdf). Though the excluded compositions are known from the publication of K. Ueda, M Nakai, M. Hosoda and K. Tai in Polymer Journal, Vol. 28, No. 12, pp 1084-1089 (1999), the advantageous properties thereof as according to the present invention are not described in said publication. Ueda et al. describe a process for preparing a polylactam having good melt-stability. Their process comprises contacting caprolactam monomer with the anionic polymerization catalyst, polymerizing said monomer under anhydrous conditions at 150° C., dissolving the polymer in DMSO, adding a protic compound to the solution, followed by a reprecipitation step to isolate the polymer from which the catalyst is removed. As the catalyst ethyl magnesium bromide was used. As chain initiator N-acetyl-ε-caprolactam was used. In the said publication Ueda et al. teach that the catalyst has to be removed to obtain a polylactam having good melt stability. In one of the experiments in said publication benzyl alcohol was used as the protic component to remove the catalyst, starting with a catalyst concentration of 0.5 mole %. This resulted however in a residual catalyst concentration of about 0.44 weight %. Though this is not reported, the amount likewise is relative to the amount of caprolactam. Nothing is mentioned in said publication about the stability of the polymer treated with benzyl alcohol, let alone the effect according to the invention that a compound having a pKa larger than 14 is powerful enough to deactivate the an alkali earth metal catalyst in the process according to the invention in such an extent that a melt-processable polylactam is obtained, without the need of extraction of residual catalyst. Neither anything is said about the cyclic dimer content of the polylactam obtained with said processes nor use of said polylactam composition in further processes involving melt-processing steps. Moreover, it is mentioned in the same publication that acids having higher pKa than 9 cannot efficiently remove the catalyst residue even at high concentration. Polymer degradation was said to be inhibited by catalyst removal treatment using an acid whose pKa is between 3 and 7.

Preferably, the polylactam composition is a polylactam composition obtainable by any of the preferred embodiments of the process according to the invention, more preferably the polylactam composition is a polylactam composition obtainable by the process wherein as the catalyst a magnesium catalyst has been used. The advantage thereof is that polylactam has good melt stability, low degree of branching and a low concentration of cyclic dimer.

The polylactam in the polylactam composition according to the invention is characterized by a low content of amine end-groups. Typically, the content of amine end-groups is below 0.0015 meq/g polylactam. Preferably the content is below 0.010, more preferably below 0.007 and most preferably below 0.005 meq/g polylactam. The advantages of the polylactam having a lower content of amine end-groups, include improved intrinsic anti-stain properties, better hydrolytic stability and improved thermal stability.

Also more preferably, the polylactam composition is a polylactam composition obtainable by the process wherein as the protic agent water has been used. The advantage thereof is that the polylactam does not contain additional polyamide-alien substances and the polyamide can easily be freed of excess of water by drying.

More preferred is also the polylactam composition obtainable by the process according to the invention wherein as the activator an acyllactam has been used. The advantage thereof is that the polylactam has a lower degree of branching.

In another preferred embodiment, the polylactam composition is a polylactam composition obtainable by the inventive process comprising a degassing step. The advantage of a polylactam composition obtained by the process comprising a degassing step is that the polymer is directly suitable for application in processes requiring a low lactam content and a low cyclic dimer content.

More preferably the polylactam composition obtainable by the inventive process comprising a degassing step has a lactam content below 0.3 weight % and a cyclic dimer content below 0.1 weight %. The advantage of the polylactam according this embodiment is that the polylactam composition has a good melt stability, and is more suitable for applications such as fibers spinning and film extrusion, which are more critical for deposits of volatile materials.

In a further preferred embodiment, the polylactam in the polylactam composition according to the invention consists for at least 50 weight % of lactam monomers, more preferably for at least 75 weight % of lactam monomers for at least 90 weight % of lactam monomers, relative to the total weight of the polylactam. Most preferably, the polylactam only comprises lactam as the monomer. In general, the higher the content of lactam in the polylactam, the more sensitive the polylactam is to degradation and to weight loss due to loss of depolymerized lactam monomer at elevated temperature. The higher the content of lactam in the polylactam according to the invention, the larger the effect of improved melt-stability is on the reduced weight loss of the polylactam when melted.

The polylactam composition according to the invention preferably consists of
a) polylactam, consisting for at least 50% by weight of caprolactam and optionally including the residues of chain initiator molecules,
b) 0.01-2 weight % of a reaction product or reaction products of a protic compound having a pKa larger than 14 and an anionic polymerization catalyst chosen from the group consisting of alkali-earth-metal-lactamates and alkali-earth-metal-lactamate forming compounds, or residues thereof,
c) 0-10 weight % caprolactam monomer,
d) 0-2 weight % caprolactam oligomers, including 0-0.3 weight % cyclic dimer,
e) 0-150 weight % of additives chosen from the group consisting of reinforcing agents, flame retardants and fillers,
f) 0-25 weight % of additives chosen from the group consisting of pigments, processing aids, stabilizers, impact modifiers, plastizisers and carrier polymers, and herein all the weight % are relative to the weight of the polylactam.

More preferably, the polylactam composition according to the invention consists of
a) polylactam, consisting for at least 75% by weight of caprolactam and optionally including the residues of chain initiator molecules
b) 0.01-1 weight % of a reaction product or reaction products of a protic compound having a pKa larger than 14 and an anionic polymerization catalyst chosen from the group consisting of alkali-earth-metal-lactamates and alkali-earth-metal-lactamate forming compounds, or residues thereof
c) 0-1 weight % caprolactam monomer
d) 0-1 weight % caprolactam oligomers, including 0-0.2 weight % cyclic dimer
e) 0-100 weight % of additives chosen from the group consisting of reinforcing agents, flame retardants and fillers,
f) 0-10 weight % of additives chosen from the group consisting of pigments, processing aids, stabilizers, impact modifiers, plastizisers and carrier polymers, and wherein all the weight % are relative to the weight of the polylactam.

Still more preferable, the polylactam composition has a caprolactam monomer content of at most 0.3 weight % and a cyclic dimer content of at most 0.2 weight %, the weight % relative to the polylactam.

Most preferable, the polylactam composition according to the invention consists of
a) polylactam, consisting for at least 90 % by weight of caprolactam and optionally including the residues of chain initiator molecules
b) 0.01-1 weight % of a reaction product or reaction products of water and anionic polymerization catalyst chosen from the group consisting of magnesium-lactamates and magnesium-lactamate forming compounds, or residues thereof
c) 0-0.3 weight % caprolactam monomer
d) 0-1 weight % caprolactam oligomers, including 0-0.2 weight % cyclic dimer wherein all the weight % are relative to the weight of the polylactam.

The caprolactam content, cyclic dimer content and oligomer contents are the contents as determined by means of LC (ISO 15300-2000). The contents of the other ingredients can be measured by standard methods.

Since polycaprolactam is hygroscopic and can absorb water upon exposure to humid air during storage, the invention also encompasses the corresponding compositions mentioned above comprising water as a further component. Preferably the content of water is at most 10 weight %, more preferably at most 5 weight %, relative to the weight of the polylactam.

The invention also relates to the use of a polylactam composition comprising a polylactam obtainable by the process according to the invention and the reaction product of a protic compound having a pKa larger than 14 and an anionic polymerization catalyst chosen from the group consisting of alkali-earth-metal-lactamates and alkali-earth-metal-lactamate forming compounds, or residues thereof, for the production of a shaped product.

The invention in particular relates to the use of any of the preferred embodiments of the inventive polylactam composition mentioned here above.

Prior to the use, the inventive compositions may be dried. This holds in particular for the compositions mentioned above comprising water as a further component. Preferably the compositions are dried, prior to their use, to a water content below 0.1 weight %, more preferably below 0.01 weight %, relative to the weight of the polylactam in the composition.

The invention further relates to shaped products made of polylactam obtainable with the process of the invention, and preferred embodiments thereof, and to articles comprising a shaped product according to the invention. These products have the advantageous properties of the polylactam, including intrinsic anti-stain properties, good thermal stability and good hydrolytic stability. These products include extruded polymer strands, fibers and films, polymer compounds and molded articles. In particular the intrinsic anti-stain properties are advantageously employed in fibers and in textile products and carpets made thereof.

The invention is further explained with the following examples, without being limited thereto.

Methods

Residual lactam content (CPL), and cyclic dimer content (CD) were determined by means of LC (ISO 15300-2000).

End group analysis was done by potentiometric titration in non-aqueous medium.

Relative viscosity (RV), was measured in 1 mass % formic acid solution.

Caprolactam conversion by weight was derived from the product loss in weight determined after extraction of the polylactam polymer.

Molecular properties were determined by SEC (ISO 16014)

Rheological properties were determined by using a Rheometrics ARES-LS disc rheometer Materials CPL: ϵ-caprolactam: AP-caprolactam, flakes (ex DSM, The Netherlands)

LMB: Catalyst C-1: 21 weight % of Caprolactam-Magnesiumbromide in caprolactam; flakes (ex DSM, The Netherlands)

IPBC: isophthaloylbiscaprolactam, powder (synthetic route according example 1 in U.S. Pat. No. 4,031,164)

NaL: Catalyst C-10: 19 weight % of sodiumcaprolactamate in caprolactam (ex DSM, The Netherlands)

HMDCC: Activator C-20: Hexamethylene-1,6-dicarbamoyl-caprolactam (caprolactam adduct of 1,6-hexanediisocyanate; 80 weight % in caprolactam) (ex DSM, The Netherlands)

AcL: N-Acetylcaprolactam

EXAMPLE I 97 parts by weight of CPL, 1 part by weight of LMB and 2 parts by weight of IPBC were mixed under nitrogen and fed to a hopper feeder under nitrogen. The mixture was fed from the hopper to a Haake Rheocord TW 100 double screw extruder equipped with intensive mixing screws. The temperature settings of the extruder were as follows: feeding zone: room temperature (cooled with water); $T_{cilinder}$: 50, 120, 260, 230° C. (head). The rotating speed (n) of the extruder was 120 rpm and the throughput 30-40 g/min. At the head of the extruder the resulting polymer melt was extruded into a strand. The strand was soaked in a water bath, in which water was being used as the protic compound having a pKa larger than 14, thereby deactivating the catalyst and cooling the strand. The cooled strand was cut into granules. The granules were dried and analyzed. The results of the analyses are summarized in Table I.

EXAMPLE II

A mixture was made of 97.5 parts by weight of ϵ-caprolactam (CPL), 1.5 part by weight of LMB and 1 part by weight of IPBC. The mixture was fed to the extruder mentioned above; the experiment was further carried out as for Example I. The results are summarized in Table 1.

COMPARATIVE EXPERIMENT A

A mixture was made of 96 parts by weight of CPL, 3 parts by weight of NaL and 1 part by weight of HMDCC. The mixture was fed to an extruder; the experiment was further carried out as for Example I. The results are summarized in Table 1.

TABLE 1

Analytical Results for Examples I-II and Comparative Experiments A

| Experiment | Example I | Example II | Comparative Experiment A |
|---|---|---|---|
| Ingredients | CPL, LMB, IPBC | CPL, LMB, IPBC | CPL, NaL, HMDCC |
| Cyclic dimer content (wt %) | 0.07 | 0.11 | 1.0 |
| Residual CPL content (wt %) | 11.9 | 9.1 | 8.5 |
| $NH_2$-end groups (meQ/g) | <0.005 | <0.005 | 0.040 |

EXAMPLES III-XV 100-grams scale polymerization experiments were performed at 230-270° C. at different levels of catalyst (0.5-0.9 weight % relative to CPL) and two types of activator, HMDCC and AcL (0.25-3 weight % relative to CPL). All products were analyzed on RV and caprolactam conversion. Some products were in addition analyzed on CPL, Cyclic Dimer (CD) amount, and on molecular- and rheological properties. The results with HMDCC as activator (Examples III-V) are summarized in Table 2. The results with AcL as activator (Examples VI-XV) are summarized in Table 3.

Based on results shown in table 2, it is concluded that the anionic polymerization with the combination LMB/HMDCC, is very fast. After 2 minutes already 80% of the caprolactam is converted. Also the cyclic dimer content in the polymer meets very strict requirements (<0.1%).

TABLE 2

Catalyst activator composition and analytical result from Examples III-V

| Example | Catalyst LMB Amount (%) | Activator HMDCC Amount (%) | T (° C.) | t (min) | Conversion (weight %) | CPL (weight %) | CD (weight %) | RV (1% in HCOOH) |
|---|---|---|---|---|---|---|---|---|
| III | 0.5 | 3 | 250 | 2 | 79.3 | 20.3 | 0.04 | 2.27 |
| IV | 0.5 | 3 | 250 | 5 | 87.7 | 11.7 | 0.06 | 4.67 |
| V | 0.5 | 3 | 250 | 10 | 89.9 | 9.5 | 0.07 | 5.30 |

TABLE 3

Catalyst activator composition and analytical results from Examples VI-XVII

| Example | Catalyst LMB Amount (%) | Activator Acyllactam Amount (%) | T (° C.) | t (min) | Conversion (weight %) | CD (weight %) | RV (1% in HCOOH) |
|---|---|---|---|---|---|---|---|
| VI | 1.5 | 1.0 | 250 | 20 | 88.6 | 0.08 | 2.33 |
| VII | 1.2 | 1.1 | 250 | 15 | 87.1 | 0.07 | 2.16 |
| VIII | 1.5 | 1.4 | 250 | 15 | 90.8 | 0.09 | 2.02 |
| IX | 1.2 | 0.65 | 250 | 20 | 86.0 | 0.09 | 2.87 |
| X | 1.5 | 1.0 | 230 | 30 | 93.3 | 0.15 | 2.47 |
| XI | 1.5 | 1.0 | 270 | 30 | 85.7 | 0.07 | 2.28 |
| XII | 0.7 | 0.9 | 250 | 20 | 67.5 | 0.04 | 2.02 |
| XIII-a | 0.7 | 0.7 | 250 | 20 | 78.9 | 0.07 | 2.69 |
| XIII-b | 0.7 | 0.7 | 250 | 60 | 82.2 | 0.08 | 2.70 |
| XIII-c | 0.7 | 0.7 | 250 | 120 | 82.0 | 0.08 | 2.69 |
| XIV | 1.1 | 1.0 | 250 | 15 | 90.1 | 0.06 | 2.38 |
| XV | 1.1 | 1.0 | 250 | 55 | 90.0 | 0.08 | 2.38 |

The results in Table 3 show that at higher temperatures the conversions of caprolactam are somewhat lower. As a consequence, higher polymerization temperatures produce a somewhat lower viscosity. Variation in polymerization time has an effect on the relative viscosity up to a certain time, above which the viscosity does not further increase. A larger, and systematic (i.e. almost linear) variation in relative viscosity values is obtained with variation in the amount of activator. With too low an amount of catalyst the relative viscosity is lower due to an incomplete conversion. With a higher amount of catalyst needed for complete conversion in the predetermined reaction time, there is no significant relation between catalyst amount and viscosity.

The molecular weight distribution of polycaprolactam obtained according the invention, is 2.3-2.4 what is somewhat higher than for polycaprolactam obtained by hydrolytic polymerisation (about 2.1).

EXAMPLE XVI

Calcium Catalyst

A: Preparation of Calcium-bis-caprolactamate

The preparation was performed under dry nitrogen atmosphere. A round-bottomed flask (250 ml), provided with mechanical stirrer, Dean Stark liquid/liquid separator and nitrogen inlet tube, was filled with 170 g dry caprolactam, 6.3 g calcium hydroxide and 22 ml m-xylene. The content of the flask was heated to 220-230° C. and, under continuous stirring, reaction water was removed by azeotropic distillation with m-xylene. After 2 hours, the original white and solid calcium hydroxide was dissolved to form a slightly opaque solution in caprolactam. Xylene and remaining reaction water were removed by bubbling a small stream of dry nitrogen through the solution at 220-230° C. during 4 hours.

B: Preparation of Calcium Catalyst Chloro-calcium-caprolactamate

After cooling the calcium-bis-caprolactamate solution to 120° C., 9.45 g finely powdered dry calcium chloride was added and stirring was continued at 120° C. After 2 hours, all calcium chloride was dissolved. The concentration of the resulting chloro-calcium-caprolactamate in caprolactam was 0.93 moles/kg.

C: Polymerisation

A mixture of 100 g dry caprolactam and 2 g of a chloro-calcium-caprolactam solution (as described before), were heated to 260° C. At 260° C., 1.5 g of N-acetyl caprolactam was mixed in and heating was continued for 5 hours. After cooling, the resulting polyamide-6 was crushed, immersed in water and analysed for concentrations of caprolactam and cyclic dimer by HPLC. The caprolactam content showed to be 18 weight %, and the cyclic dimmer content was 0.2 weight %, relative to the total weight of the solid material.

EXAMPLE XVII-XVIII

Thermal Stability

Example XVII

Polycaprolactam obtained by anionic polymerization of caprolactam, N-acetylcaprolactam and LMB in the melt (RV sulphuric acid 2.57, COOH and amine <1 mmol/kg), was, after cooling, soaked with water (pKa 15.7) as protic agent. After drying, a sample was heated in dry nitrogen at 230° C. After 5, 10 and 15 minutes heating, the melt viscosity of the polycaprolactam was detected by performing rheology analysis. The results are given in table 4.

Example XVIII

Polycaprolactam obtained by anionic melt polymerization of caprolactam, N-acetylcaprolactam and LMB (RV sulphuric acid 2.57, COOH and amine <1 mmol/kg), was in the melt soaked with tert-butyl alcohol (pKa 18) as protic agent. After drying, a sample was heated in dry nitrogen at 230° C. After 5, 10 and 15 minutes heating, the melt viscosity of the polycaprolactam was detected by performing rheology analysis. The results are given in table 4.

COMPARATIVE EXPERIMENT B

A polycaprolactam obtained by hydrolytic polymerization (RV 2.45, COOH 60 mmoles/kg and amine 35 mmoles/kg) was heated in dry nitrogen at 230° C. After 5, 10 and 15 minutes heating, the melt viscosity of the polycaprolactam was detected by performing rheology analysis. The results are given in table 4.

TABLE 4

Analytical results examples XVII-XVIII and Comparative Experiment B

| | Melt viscosity (Eta)/Pa · s (230° C.) | | |
|---|---|---|---|
| Time (min) | Example XVII | Example XVIII | Comparative Experiment B |
| 5 | 260 | 260 | 213 |
| 10 | 272 | 270 | 235 |
| 15 | 282 | 280 | 249 |
| Slope Eta (Pa · s/min) | 2.2 | 2.0 | 3.6 |

The results in table 4 show improved thermal stability of the polycaprolactam according the invention even in comparison with a polycaprolactam obtained by conventional hydrolytic polymerization.

The invention claimed is:

1. Process for preparing a melt-processable polylactam comprising the steps of:
   (a) contacting caprolactam monomer with an anionic polymerization catalyst selected from the group consisting of alkali-earth-metal-lactamates and alkali-earth-metal-lactamate forming compounds;
   (b) polymerizing the caprolactam monomer under anhydrous conditions as a mass melt process conducted at a temperature condition greater than melting temperatures of the caprolactam monomer and the polylactam to form a polylactam melt, and
   (c) contacting the resulting polylactam from step (b) in solid form or as a melt with a protic compound thereby deactivating the catalyst, wherein the protic compound has a pKa of at least 15.

2. Process according to claim 1, wherein the catalyst is a magnesium lactamate or a magnesium lactamate forming compound.

3. Process according to claim 1, wherein the protic compound has a pKa between 15 and 18.

4. Process according to claim 1, wherein the protic compound is water or a water forming metal hydroxide.

5. Process according to claim 1, wherein the lactam is contacted with an activator.

6. Process according to claim 5, wherein the activator is an acyllactam.

7. Process according to claim 1, wherein the polymerization is conducted at a temperature between 5° C. and 80° C. above the melting temperature of the polylactam.

8. Process according to claim 1, wherein the polymerization is carried out as a continuous process.

9. Process according to claim 1, wherein the process comprises an extraction step, or a degassing step, a compounding step and/or a polymer shaping step.

10. Process according to claim 1, wherein the protic compound has a pKa of between 15.5 and 16.

\* \* \* \* \*